United States Patent
Kutchmarek et al.

(10) Patent No.: US 6,681,673 B1
(45) Date of Patent: *Jan. 27, 2004

(54) CUTTING APPARATUS FOR WINDOW COVERINGS AND METHODS THEREFOR

(75) Inventors: Darrell J. Kutchmarek, Waunakee, WI (US); Richard L. Seiders, McFarland, WI (US)

(73) Assignee: Springs Window Fashions LP, Fort Mill, SC (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 180 days.

(21) Appl. No.: 09/245,596

(22) Filed: Feb. 5, 1999

Related U.S. Application Data

(62) Division of application No. 09/054,845, filed on Apr. 3, 1998, now Pat. No. 6,435,066.
(60) Provisional application No. 60/068,039, filed on Dec. 18, 1997.

(51) Int. Cl.$^7$ .............................. B23D 23/00; B26D 1/12; B26D 5/08
(52) U.S. Cl. .............................. 83/468; 83/627; 83/636; 83/694; 83/929
(58) Field of Search ................................. 83/29, 39, 94, 83/627, 629, 694, 468, 467.1, 468.7, 468.6, 636

(56) References Cited

U.S. PATENT DOCUMENTS

| | | | |
|---|---|---|---|
| 245,330 A | * 8/1881 | Walker | 83/638 |
| 276,265 A | * 4/1883 | Meyer | 83/629 |
| 290,004 A | * 12/1883 | Donnell | 83/638 |
| 1,122,558 A | * 12/1914 | Vertunni et al. | 83/642 |
| 1,243,390 A | * 10/1917 | Dobbins | 83/638 |
| 1,343,079 A | * 6/1920 | Fegley et al. | 83/629 |

(List continued on next page.)

FOREIGN PATENT DOCUMENTS

| | | |
|---|---|---|
| EP | 0265564 | 5/1988 |
| EP | 0273535 | 7/1988 |
| GB | 2197012 A | 5/1988 |
| GB | 2197374 A | 5/1988 |
| GB | 2199607 A | 7/1988 |
| JP | 55-11774 | 1/1980 |
| JP | 62-148114 | 7/1987 |
| JP | 62-148115 | 7/1987 |
| JP | 62-153482 | 7/1987 |
| JP | 62-153483 | 7/1987 |
| JP | 63-125794 | 5/1988 |

OTHER PUBLICATIONS

Four photographs showing a guillotine–type cutting machine for fabric only, sold by Springs Window Fashions Division, Inc. prior to Apr. 3, 1997.

Primary Examiner—Stephen Choi
(74) Attorney, Agent, or Firm—Lerner, David, Littenberg, Krumholz & Mentlik, LLP

(57) ABSTRACT

An apparatus for cutting a window covering including a head rail, a bottom rail and slats includes a base having a substantially flat cutting surface, and a frame overlying the cutting surface. The base includes a clamping assembly for securing the window covering atop the cutting surface with the bottom rail, slats and top rail in a side-by-side arrangement over the cutting surface. The apparatus includes a cutting assembly having a cutting blade with a cutting edge for sliding along a movement axis having a first component of movement extending in a direction substantially parallel to the cutting surface and a second component of movement extending in a direction substantially perpendicular to the cutting surface. A driver is connected with the cutting assembly for moving the cutting blade toward the cutting surface, wherein the cutting edge simultaneously cuts through the bottom rail, the slats and the head rail.

17 Claims, 12 Drawing Sheets

U.S. PATENT DOCUMENTS

| | | |
|---|---|---|
| 1,721,276 A | 7/1929 | Marsilius |
| 2,057,488 A | 10/1936 | Hochstadt |
| 2,346,100 A | 4/1944 | Wright |
| 2,827,686 A | 3/1958 | Adelman |
| 2,837,152 A | 6/1958 | Moore, Jr. |
| 2,883,736 A | 4/1959 | Crane |
| 3,260,146 A | 7/1966 | Child |
| 3,263,544 A | 8/1966 | Margolien |
| 3,584,380 A | 6/1971 | Mehler et al. |
| 3,766,815 A | 10/1973 | Edixhoven |
| 4,139,043 A | 2/1979 | Donofrio |
| 4,157,108 A | 6/1979 | Donofrio |
| 4,468,995 A | 9/1984 | Mireles-Saldivar |
| 4,567,930 A | 2/1986 | Fischer |
| 4,625,868 A | 12/1986 | Bischof |
| 4,639,987 A * | 2/1987 | Georgopoulos ............. 29/24.5 |
| 4,643,238 A | 2/1987 | Tachikawa et al. |
| 4,730,372 A | 3/1988 | Tsuchida |
| 4,790,226 A | 12/1988 | Tsuchida ..................... 83/208 |
| 4,819,530 A | 4/1989 | Huang |
| 4,907,325 A * | 3/1990 | Hsu .......................... 29/33 P |
| 4,993,131 A | 2/1991 | Graves et al. |
| 5,037,253 A | 8/1991 | Molaro et al. |
| 5,056,388 A | 10/1991 | Dekker et al. |
| 5,072,494 A | 12/1991 | Graves et al. |
| 5,103,702 A | 4/1992 | Yannazzone |
| 5,339,716 A | 8/1994 | Sands et al. |
| 5,456,149 A | 10/1995 | Elsenheimer et al. |
| 5,799,557 A * | 9/1998 | Wang ........................ 29/24.5 |
| 5,806,394 A * | 9/1998 | Marocco ..................... 29/24.5 |
| 5,816,126 A * | 10/1998 | Pluber ........................ 83/627 |

* cited by examiner

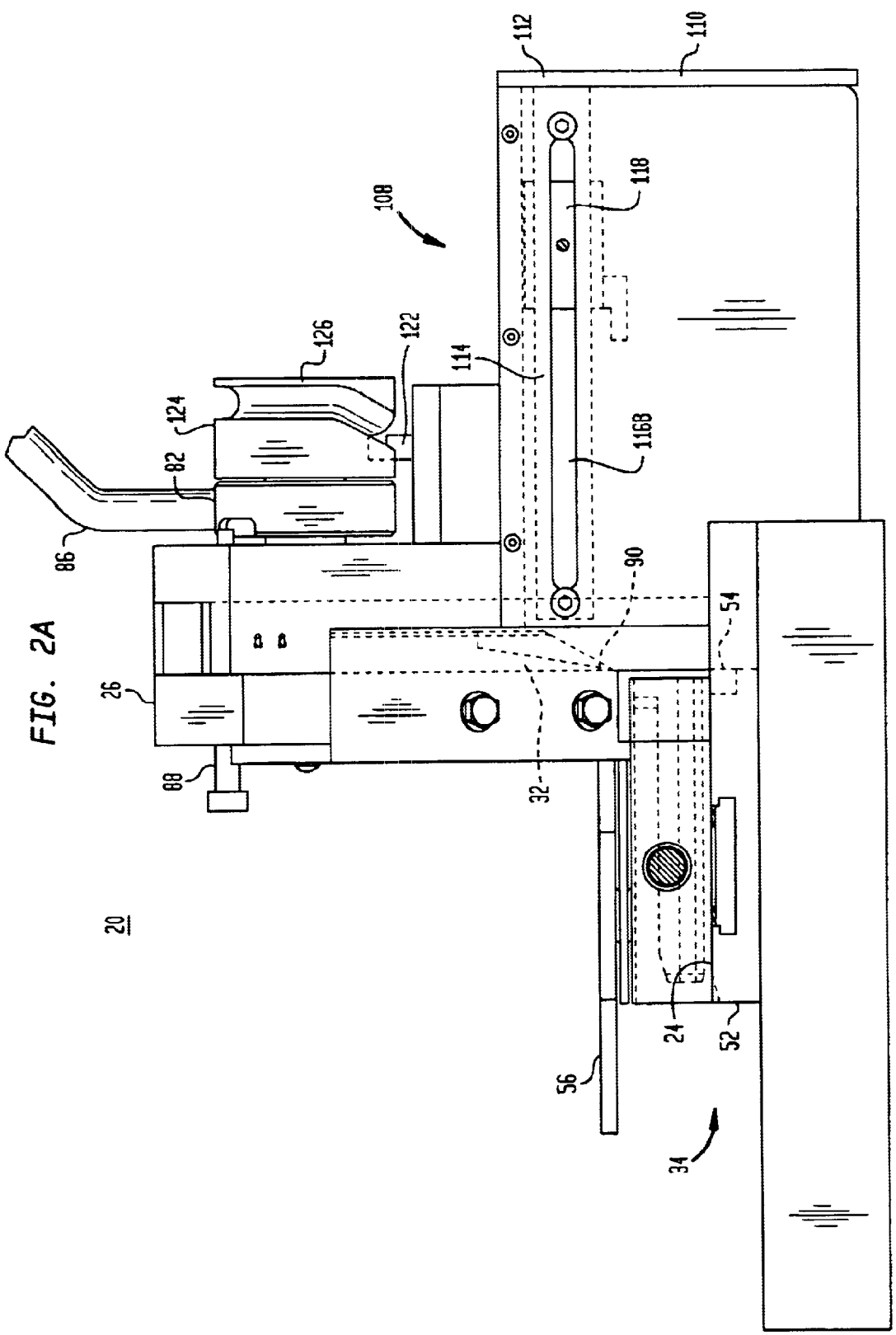

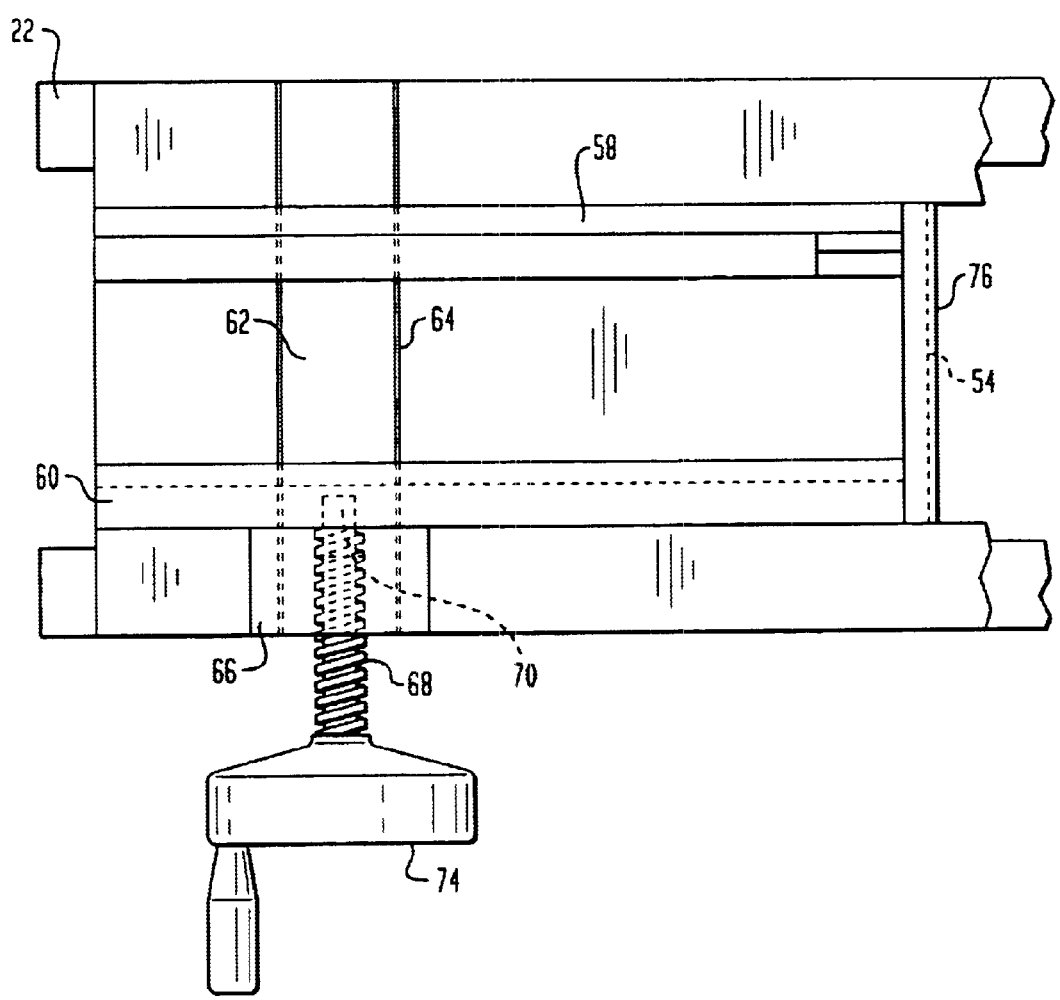

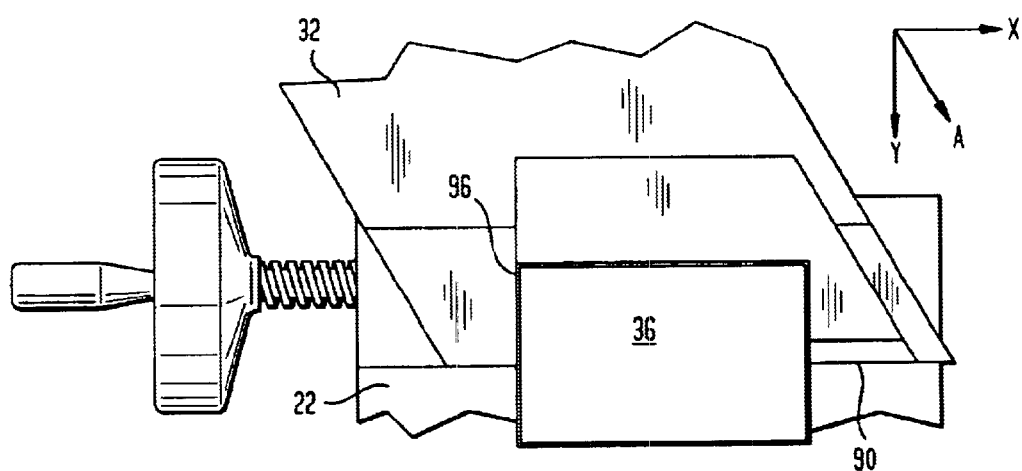

CUTTING APPARATUS FOR WINDOW COVERINGS AND METHODS THEREFOR

CROSS-REFERENCE TO RELATED APPLICATIONS

The present invention is a divisional application of application Ser. No. 09/054,845, filed Apr. 3, 1998, now U.S. Pat. No. 6,435,066, which claims benefit of U.S. Provisional Application Ser. No. 60/068,039 filed Dec. 18, 1997, and the disclosures of both of these applications are hereby incorporated by reference herein.

FIELD OF THE INVENTION

The present invention relates generally to the art of window coverings and more specifically relates to cutting machines and methods for cutting window coverings to specified lengths.

BACKGROUND OF THE INVENTION

Retail outlets frequently sell many different types of window coverings such as draperies, curtains, venetian blinds and shades. These window coverings generally extend horizontally across a window opening and are typically sized to accommodate the dimensions of the window opening. One popular type of window covering is a window shade having a head rail, a bottom rail and a window covering material between the head rail and the bottom rail. Common window covering materials include slats, such as PVC slats, or fabric. One problem with such window shades is that the width of the head rail, the bottom rail and the window covering material must be customized to match the exact dimensions of the window opening. In response to this problem, a number of options have been developed so that consumers may obtain customized window shades which are sized to fit a specific window opening.

In accordance with a first option, a customer typically visits a specialty shop or department store and places an order for customized window shades. This option requires the customer to first measure the window opening and submit the measurements to a salesperson. The salesperson will then submit the order to a factory or distribution center where the window shade is cut to the specified length. This option is rather time consuming, because the customer must make at least two visits to the retail outlet in order to obtain the customized product, i.e. a first visit to place the order and a second visit to pick up the product. In addition, this particular option is relatively expensive.

A second option involves selecting the window shade from a stock of pre-sized shades maintained at the retail establishment. Typically, only certain standard sizes are carried because some window openings, especially in newer homes and offices, are of standard dimensions. These pre-stocked, standardized window shades are usually much less expensive than those obtained from custom specialty shops because stocked shades may be mass-produced in an economical manner. In addition, the cost to the consumer is reduced because there is no need to perform a cutting or sizing operation at the retail establishment.

A third option has recently evolved. This particular option involves the in-store sizing or cutting of the window shades to match the exact window dimensions specified by the customer. Various machines and methods for performing these tasks are disclosed in U.S. Pat. Nos. 5,339,716; 5,037,253; 5,456,149; 4,993,131; 5,072,494 and 5,103,702. These various disclosures have been generally inadequate at providing systems for efficiently and accurately sizing window shades to specified lengths. For example, most of the systems disclosed are too complex to be operated by a typical retail salesperson having an average degree of training. In addition, many of these systems require numerous steps in order to cut the window shade, i.e. the head rail is cut in a first cutting operation and the window covering material is cut in a second cutting operation. Further, these systems, and particularly the cutting blades of these systems exert a tremendous amount of force upon the window shade being cut which often results in the cut ends of the shades being uneven, chipped or cracked. These defects produce a final product of inferior quality.

Thus, there is a need for a cutting apparatus for window shades capable of efficiently customizing window shades to fit window dimensions specified by customers. There is also a need for a cutting apparatus for cutting a window shade to a specified length, whereby the entire window shade, namely the head rail, the bottom rail and the window covering material are all cut simultaneously in a single cutting stroke, thereby saving time and reducing operator errors. Moreover, the cutting apparatus should produce a final product having a high-quality, professionally-cut appearance. Applicant is presently the exclusive licensee of such an improved cutting machine which is disclosed in U.S. patent application Ser. No. 08/627,015 entitled "End Trimming Device For Blinds", the disclosure of which is hereby incorporated by reference herein. Another improved cutting device is sold by the Applicant, Springs Window Fashions, under the trademark "Crystal Pleat Cut-Down Machine."

However, still further improvements would be desirable.

SUMMARY OF THE INVENTION

In accordance with certain preferred embodiments of the present invention, a cutting apparatus is provided for cutting a window shade to a specified length. The window shade preferably includes a head rail, a bottom rail and a window covering material or covering material. The window covering material or covering material typically includes a fabric or slats provided between the head rail and the bottom rail. The head rail and the bottom rail preferably comprise a substantially rugged material, such as extruded plastic, which can be readily cut to specified lengths.

The cutting apparatus preferably includes a base having a top or cutting surface and a frame overlying the cutting surface of the base. The frame is preferably mounted to the base to form a rigid structure. The frame and the cutting surface define a receiving area therebetween for receiving one or more window shades which will be cut in the cutting apparatus. A cutting assembly is slidably mounted to the frame for sliding along a movement axis toward and away from the receiving area. The frame preferably includes one or more guide tracks which are angled with respect to the cutting surface of the base and the cutting assembly is slidably mounted in the guide tracks so that the movement axis is diagonal to the cutting surface of the base. The cutting assembly includes a cutting blade having a cutting edge facing the receiving area. The cutting apparatus also includes a mechanical element, such as a driver, which may be operated to impart sliding motion to the cutting assembly. The driver may include a rack and pinion gear arrangement, a ratcheting mechanism, a screw-activated element, a pneumatic element or an electrical-motor operated device. In one particular preferred embodiment the cutting assembly includes a rack having a plurality of teeth. A pinion, having a plurality of teeth at a periphery thereof, is rotatably mounted in the frame. The pinion is matingly engaged with the rack so that when the pinion is rotated, the pinion imparts sliding motion to the cutting assembly to move the cutting blade diagonally through the receiving area for cutting the window shade to the specified length. As the cutting blade moves toward and away from the cutting surface, the cutting edge remains at all times substantially parallel to the top of the cutting surface.

The base may include a support guide, provided over the cutting surface thereof, for guiding movement of the window shade across the cutting surface of the base and towards the receiving area. In preferred embodiments, the support guide includes a mandrel which engages at least one of the head rails or bottom rails and which most preferably engages the head rail during cutting operations. The mandrel extends along the cutting surface of the base from a first end of the cutting surface to a second end of the cutting surface. The second end of the cutting surface is preferably adjacent the cutting blade.

In certain preferred embodiments the base includes a clamp assembly for securing the window shade over the cutting surface of the base. The clamp preferably includes a clamp block having a threaded bore, a threaded shaft which is capable of being rotated and a crank handle. The threaded shaft has a first end which is threadably connected to the clamp block and a second end which is rotatably connected to the crank handle. Rotation of the crank handle moves the clamp block into and out of engagement with the window shade. The crank handle is preferably rotated in a clockwise or counter-clockwise direction so as to apply a clamping force to the window shade. In other preferred embodiments the clamp may include a pneumatic device, an electrically operated device, a screw device, a ratcheting device or a weight.

The cutting blade is preferably provided at the second end of the cutting surface and has a longitudinal axis which is substantially perpendicular to the longitudinal axis of the guide rail. The cutting blade has a first face which is substantially flat and a second face which includes a pocketed portion. The pocketed portion of the cutting blade is preferably the only section of the blade which engages and cuts the window shade. The pocket is substantially thinner than the area of the cutting blade which surrounds the pocket. The pocketed portion includes a tapered region which is contiguous with the cutting edge and which extends up and away from the cutting edge. The tapered region has a first tapered section or bevel which extends from the cutting edge. The first tapered section and the substantially flat first face define a first acute angle. The tapered region includes a second tapered section which extends from the first tapered section. The second tapered section and the substantially flat first face define a second acute angle which is smaller than the first acute angle. The substantially flat first face of the cutting blade preferably faces upstream toward the first end of the top surface of the base while the second face (i.e. the face including the pocketed portion) preferably faces downstream and away from the first end of the top surface.

The cutting blade preferably includes any material, man-made or naturally occurring, having the strength and/or durability to efficiently cut through the shade assembly, and more preferably includes carbide steel or diamond.

The cutting apparatus also preferably includes a measuring assembly adjacent and/or downstream from the cutting blade for measuring the window shade. Specifically, the measuring assembly provides a measuring tool for defining the exact length of the end portion of the window shade to be cut. The measuring assembly preferably includes a stop block which abuts against the end portion of the window shade. The stop block is connected to a cam follower which in turn is connected to the pinion so that the stop block moves away from the end of the window shade as the cutting blade slices through the window shade. By camping away, the stop block allows the cut end portion of the window shade to pivot away from the cutting blade which minimizes the forces exerted by the cutting blade upon the window shade. Thus, the stop block is movable between a first position and a second position. In the first position, the stop block abuts against the end portion of the window shade. In the second position the stop block is not in contact with the end portion of the window shade because the stop block cams away from the end portion.

Another aspect of the present invention provides a method of cutting a window shade to a specified length. In certain preferred embodiments a method of cutting the window shade includes providing a cutting apparatus having a receiving area for receiving the window shade whereby the cutting apparatus includes a cutting blade slidably mounted therein for sliding along a movement axis toward and away from the receiving area. Next, the window shade is provided in the receiving area and the cutting blade is passed diagonally through the receiving area and the window shade for cutting off an end portion of the window shade to provide a window shade having a specified length. Initially, the window shade is inserted into the first end of the cutting apparatus and slid along a cutting surface of the base toward the cutting blade so that the cutting blade overlies the end portion of the window shade which is to be cut. The measuring assembly is then utilized to determine the exact length of the end portion of the window shade being cut. Once the exact length of the end portion to be cut has been determined, the crank handle of the clamping assembly is rotated so that the clamping block moves into engagement with the window shade so as to secure the window shade between the clamp block and the guide rail. The crank continues to be rotated until the clamping block has secured the window shade over the cutting surface of the base. The pinion is then rotated to move the cutting assembly. A lever handle is preferably connected to the pinion to facilitate rotation of the pinion. Rotation of the pinion slides the cutting assembly in the angled guide tracks along the movement axis which is diagonal to the cutting surface of the base so that the cutting blade slices diagonally through the window shade. As the cutting blade slices through the window shade, the stop block cams away from the end portion of the window shade being cut so that the cut end portion is free to pivot away from the cutting blade. Because the end of the window shade being cut is free to pivot away from the blade, the compression forces exerted by the cutting blade upon the window shade are greatly reduced which greatly reduces the likelihood that the head rail or the bottom rail will crack while being cut. After the window shade has been completely cut, the direction of the lever handle is preferably reversed to return the cutting blade to its initial position. The measuring assembly moves back towards the cutting blade as the handle is returned to its initial start position. At this point the window shade may be removed from the cutting apparatus. In certain instances it may be preferable to trim or cut a second end of the window shade to a specified length. This may be accomplished by inserting the second end of the window shade into the cutting apparatus and repeating the steps described above.

These and other objects, features and advantages of the present invention will be more readily apparent from the detailed description of the preferred embodiment set forth below and when taken in conjunction with the accompanying drawings.

BRIEF DESCRIPTION OF THE DRAWINGS

FIG. 2A shows a front view of the cutting apparatus shown in FIG. 1.

FIG. 4A shows a top view of a base of the cutting apparatus shown in FIG. 1 according to one preferred embodiment of the present invention.

FIG. 7C shows the cutting blade of FIG. 7B during a still further stage of the cutting operation.

DETAILED DESCRIPTION OF THE PREFERRED EMBODIMENTS

Figure 1:
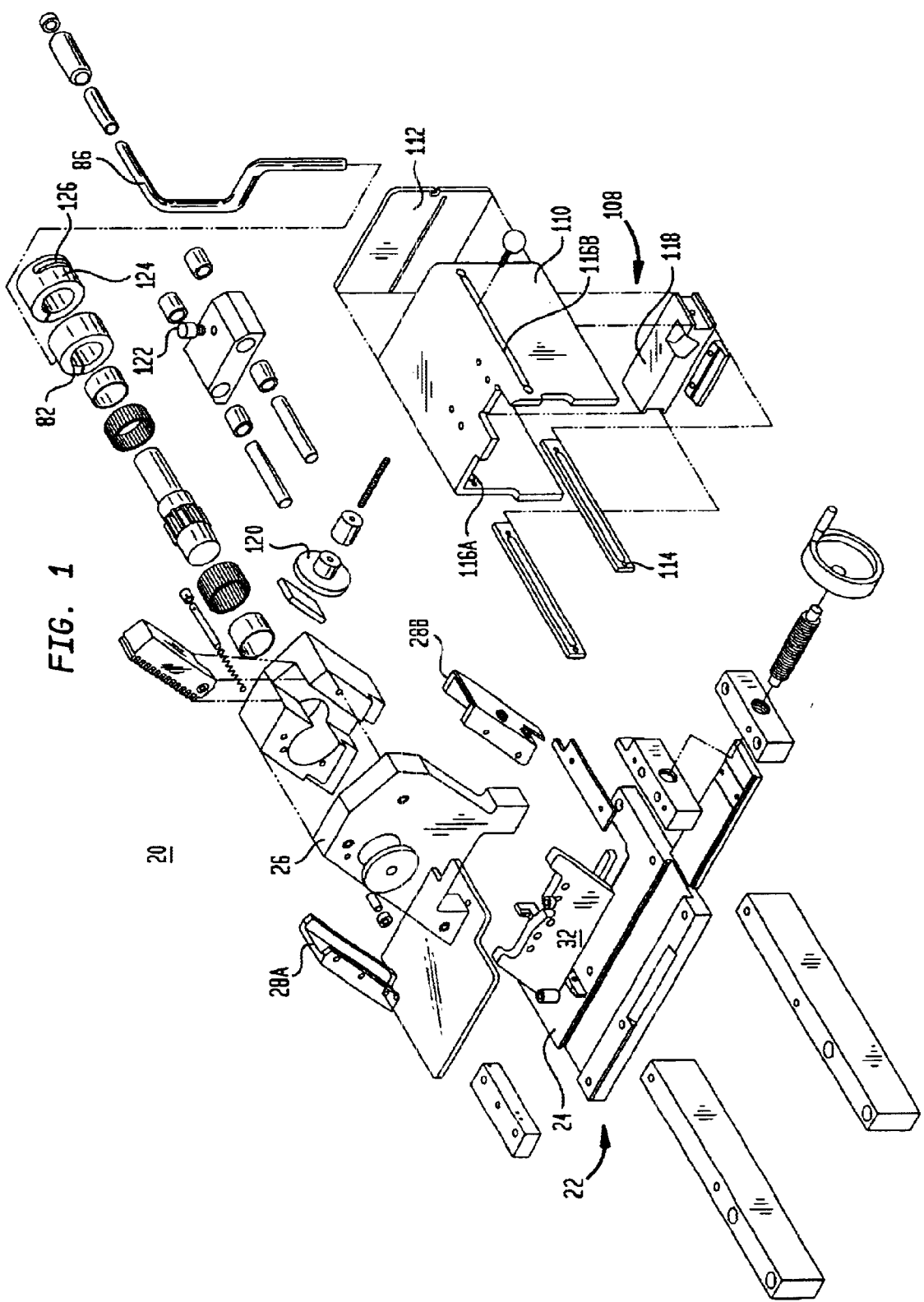
FIG. 1 shows an exploded perspective view of a cutting apparatus for cutting a window shade to a desired length according to one preferred embodiment of the present invention.
Figure 2B:
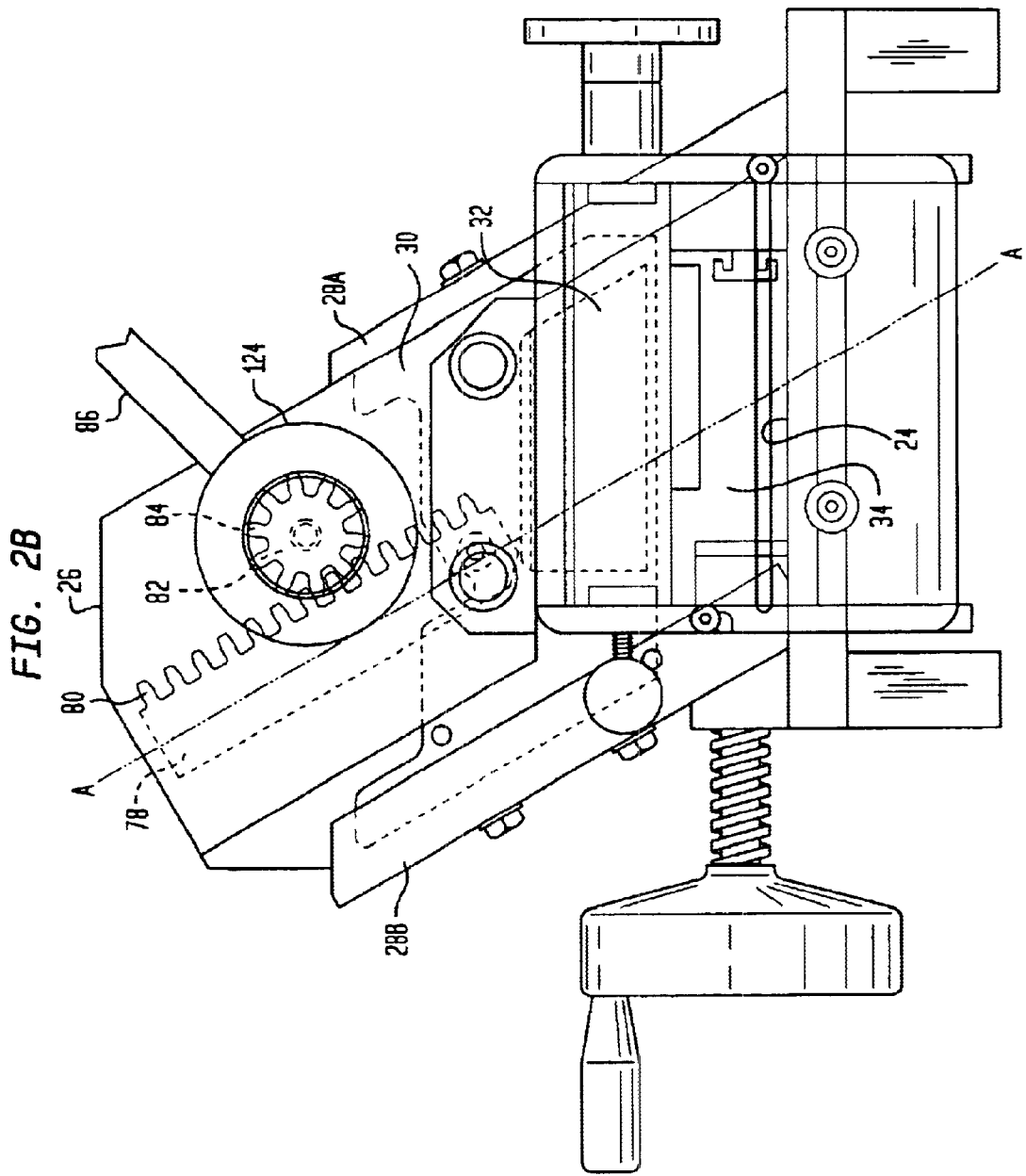
FIG. 2B shows a right side view of the cutting apparatus shown in FIG. 2A.

Referring to FIGS. 1, 2A and 2B, preferred embodiments of the present invention provide a cutting apparatus 20 for cutting or sizing a window shade to a specified length. The cutting apparatus 20 preferably includes a base 22 having a substantially flat cutting surface 24 and a frame 26 which overlies the substantially flat cutting surface 24 of the base 22. The frame 26 is mounted to the base 22 so that the frame 26 and the base 22 form a substantially rigid structure. The frame 26 includes guide tracks 28A and 28B which are angled with respect to the cutting surface 24 of the base 22. The angle formed by the guide tracks 28A, 28B and the cutting surface 24 is preferably between one to 89 degrees. A cutting assembly 30 including a cutting blade 32 is slidably mounted in the guide tracks 28A and 28B and moves along a movement axis designated A—A which is diagonal to the cutting surface 24 of the base 22. The cutting surface 24 of the base 22 and the frame 26 define an aperture or receiving area 34 into which an end portion of a window shade is preferably inserted in order to be cut by the cutting apparatus 20. The cutting apparatus 20 is preferably capable of cutting entirely through the end of the window shade with a single pass of the cutting blade 32. The terms "top", "bottom", "front", "side", "first" and "second" are used herein to indicate directions relative to the cutting apparatus itself. It should be understood that these terms are used to refer to the frame of reference of the apparatus itself, and not to the ordinary, gravitational frame of reference.

Figure 3A:
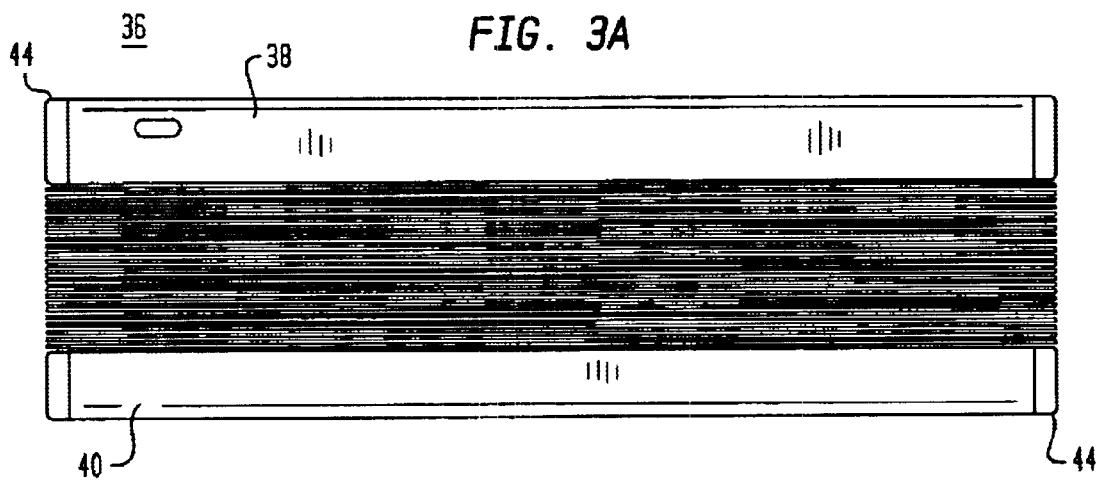
FIG. 3A shows a perspective front view of one preferred window shade cut to a specified length in the cutting apparatus shown in FIG. 1.
Figure 3B:
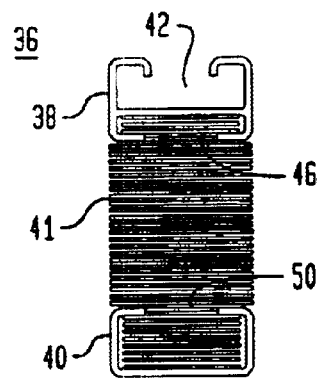
FIG. 3B shows a side view of the window shade shown in FIG. 3A.

Referring to FIGS. 3A and 3B, one preferred window shade 36 capable of being cut by the cutting apparatus 20 described above includes a headrail 38, a bottom rail 40 and window covering material 41 therebetween. The head rail 38 and the bottom rail 40 preferably include an extruded plastic material. The window covering material 41 may include a fabric, such as a point bonded polyester blend material, or may include slats which generally comprise a somewhat flexible material, such as polyvinyl chloride (PVC). The top portion of the head rail 38 has a "C"-shaped opening 42 which may be used for securing the shade 36 to a window opening or for rigging the window shade 36 with control lines. The head rail 38 also preferably includes a lower "C"-shaped opening 46 for securing a top section of the window covering material 41. The bottom rail 40 also has a "C"-shaped opening 50 for receiving and securing a bottom section of the window covering material 41. The window shade 36 also includes removable end caps 44 at the ends of the head rail 38 and the base rail 40.

Figure 4B:
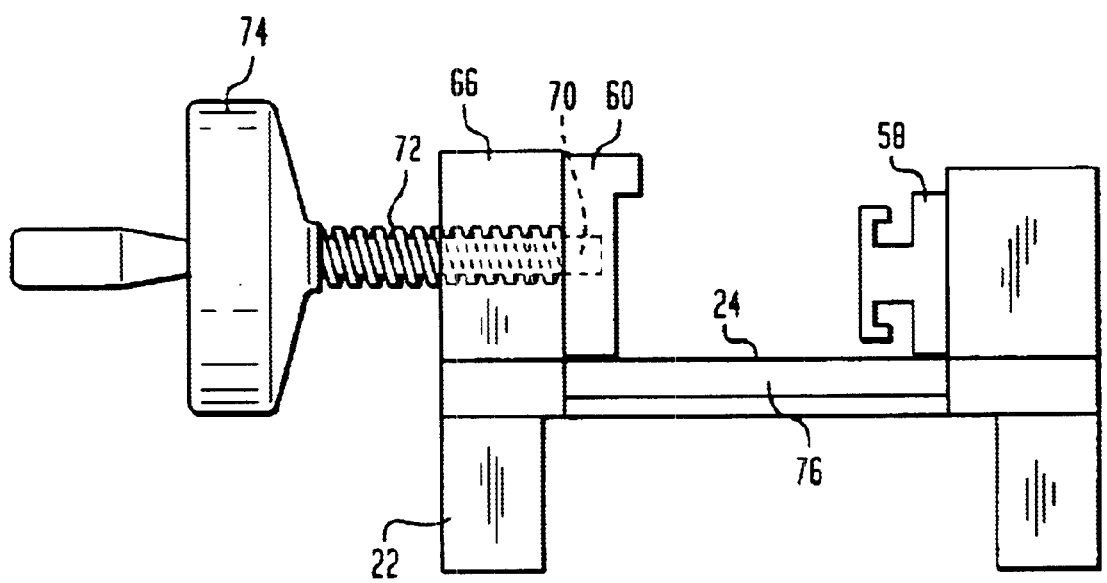
FIG. 4B shows a right side view of the base shown in FIG. 4A along the sectional line designated 4B—4B in FIG. 4A.

The end caps 44 stabilize the ends of the head rail 38 and the base rail 40 and improve the overall aesthetic appearance of the window shade 36. The ends caps 44 are preferably removed before the window shade 36 is cut and reinstalled into the rail ends after the cutting operation. Referring to FIGS. 4A and 4B, the base 22 generally includes a hardened steel. The cutting surface 24 of the base 22 preferably has a first end 52 which initially receives the window shade 36 and a second end 54 which is adjacent the cutting blade (FIG. 2A). As shown in FIG. 2A, a safety guard 56, designated the left hand guard, preferably overlies the first end 52 of the cutting surface 24 so as to prevent an operator from placing his or her hands under the cutting blade 32. The hand guard 56 preferably comprises a hardened, rugged material such as a metal or a clear plastic material, such as Lexan, Plexiglas or Acrylic. Referring to FIGS. 4A and 4B, the base 22 preferably includes a guide rail 58 which overlies the cutting surface 24 and extends from the first end 52 of the cutting surface 24 to the second end 54 thereof. The guide rail 58 serves to align the head rail 38 over the cutting surface 24 of the base 22 and guide the head rail 38 over the cutting surface 24. The guide rail 58 is preferably a mandrel shaped to fit relatively snugly within the "C"-shaped opening 42 at the top of the headrail 38. The base 22 also includes a clamping assembly for securing the window shade 36 to the cutting surface 24 of the base 22 prior to cutting the window shade 36. The clamping assembly includes a clamp block 60 extending over the cutting surface 24 in a longitudinal direction which is substantially parallel to the guide rail 58. The clamp block 60 preferably moves independently of the base and is attached to a sliding portion 62 provided in a slot 64 cut into the cutting surface 24 of the base 22 so that the clamp block 60 may slide towards and away from the guide rail 58. The clamp block 60 is connected to a threaded block 66 having a threaded bore therein. The threaded block 66 is preferably rigidly connected to the base 22 so that the threaded block does not move independently of the base 22. The clamping assembly also includes a rotatable, threaded shaft 68 having a first end 70 which is connected to the clamp block 60 and a second end 72 which is rotatably connected to a crank handle 74. Rotation of the crank handle 74 rotates the threaded shaft 68 which in turn moves the clamping block 60 toward and away from the guide rail 58.

The top surface 24 of the base 22 preferably includes a backup 76 which opposes the cutting blades 32. The backup 76 is preferably located at the second end 54 of the cutting surface 24 of the base 22 and extends slightly beyond the second end 54 of the cutting surface 24. In certain preferred embodiments the backup 76 extends between approximately 1/32 inch and 3/32 inch beyond the second end 54. The backup 76 preferably includes a hardened material, such as a nylon material, which is relatively softer than the material comprising the cutting blade 32, so that the backup is stiff enough to adequately support the window shade 36 and so that the cutting blade 32 is not prematurely dulled when it repeatedly abuts against the backup 76 during cutting operations.

Referring to FIG. 2B, the frame 26 includes guide tracks 28A and 28B which are angled relative to the cutting surface 24 of the base 22. The cutting assembly 30 is slidably mounted in the guide tracks 28A and 28B and is capable of sliding within the guide tracks 28A and 28B along the movement axis designated A—A. The movement axis A—A has both a downward vertical component (Y-axis) and a horizontal component (X-axis). Thus, the movement axis A—A is diagonal with respect to the cutting surface 24 of the base 22 so that the cutting blade 32 moves along both the y axis and x axis with respect to the cutting surface 24. The cutting assembly 30 preferably includes a rack 78 having a plurality of teeth 80 so that the cutting assembly 30 may be operated using a rack and pinion mechanism. A driver such as a pinion 82 having a plurality of teeth 84 is rotatably mounted in the frame 26 and is matingly engaged with the rack 78 so that the teeth 84 of the pinion 82 mesh with the teeth 80 of the rack 78. A lever handle 86 is connected to the pinion 82 and preferably has considerable length for providing leverage so that the pinion 82 may be readily rotated by an operator. As the pinion 82 rotates, the teeth 84 of the pinion 82 mesh with the teeth 80 of the rack 78 so as to impart sliding motion to the cutting assembly 30 and move the cutting assembly 30 within the guide tracks 28A and 28B.

Referring to FIG. 2A, a safety pin 88 is provided at an exterior surface of the frame 26. The safety pin 88 meshes with the pinion 82 so that the handle 86 cannot move until the safety pin 88 is retracted. In preferred embodiments, the safety pin 88 is provided on one side of the frame 26 and the handle 86 is provided on an opposite side of the frame 26. This particular design feature ensures that an operator's hands will not be positioned under the cutting blade 32 during a cutting operation because one of the operator's hands must retract the safety pin 88 while the other hand is pulling the handle 86. Once the safety pin 88 has been retracted, the handle 86 is preferably pulled downward towards the operator so as to rotate the pinion 82.

Figure 5A:
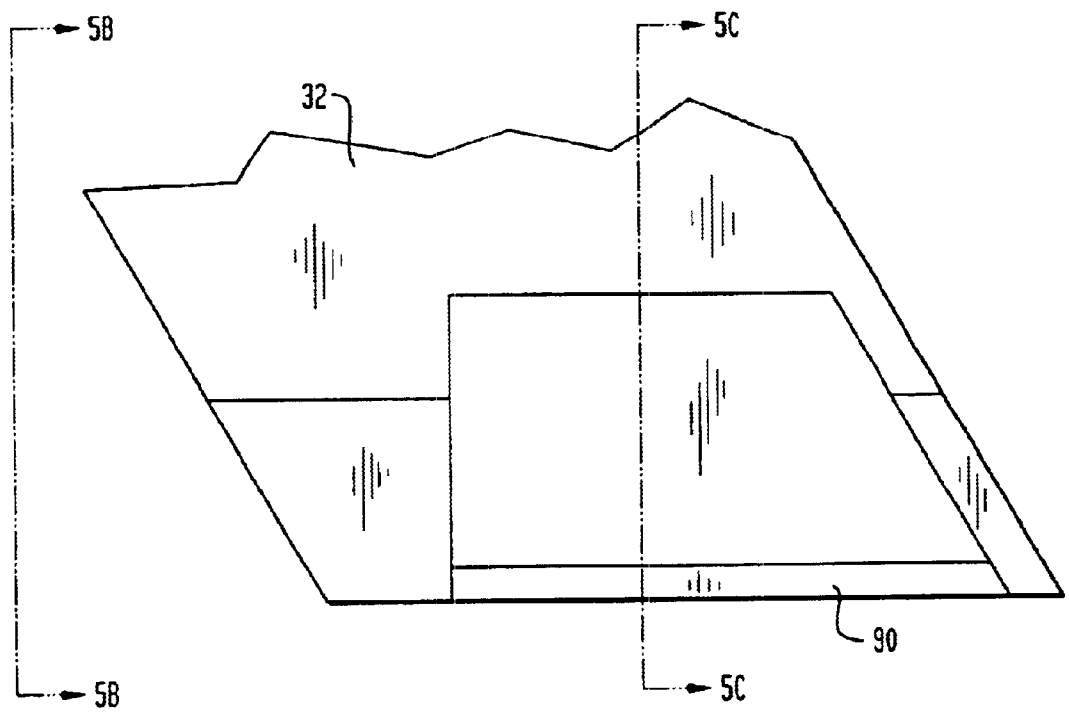
FIG. 5A shows a fragmentary view of a face of a cutting blade of the cutting apparatus shown in FIG. 1 according to certain preferred embodiments of the present invention.
Figure 5B:
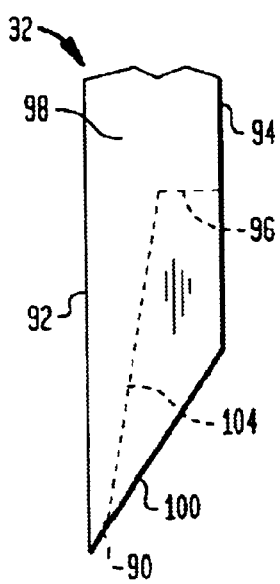
FIG. 5B shows a fragmentary side view of the cutting blade shown in FIG. 5A along the sectional line designated 5B—5B in FIG. 5A.
Figure 5C:
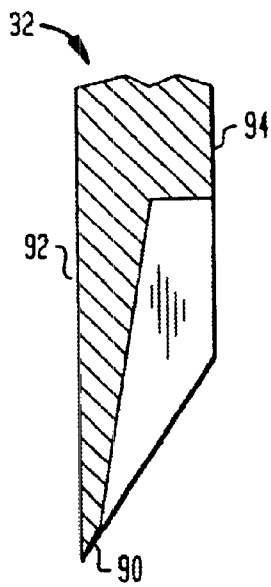
FIG. 5C shows a cross-sectional fragmentary side view of the cutting blade shown in FIG. 5A along the sectional line designated 5C—5C in FIG. 5A.

Referring to FIGS. 5A–5C, the cutting blade 32 is relatively massive and has a cutting edge 90 which faces the window shade to be cut. In certain embodiments the cutting blade 32 includes carbide steel. In other preferred embodiments the cutting edge 90 of the cutting blade 32 may include diamond. As shown in FIGS. 5B and 5C, the cutting blade 32 includes a first face 92 which is substantially flat. The cutting blade 32 also has a second face 94 remote from the first face 92. The second face 94 includes a concave pocket 96 cut into the second face 94. The thickness of the pocketed portion 96 of the cutting blade 32 is substantially thinner than the remaining portion of the blade which surrounds the pocketed portion. For example, as shown in FIG. 5B, upper portion 98 of the cutting blade 32, i.e. the massive portion surrounding the pocket 96, is between approximately 0.40 to 0.50 inches thick while the pocketed portion 96 of the blade 32 is between approximately 0.10 and 0.20 thick. The pocket 96 preferably includes a tapered section which tapers outwardly from the cutting edge 90 of the blade 32. In other words, the pocket 96 of the blade 32 becomes thicker as the distance from the cutting edge 90 increases. However, the thickness of the pocket 96 always remains less than the thickness of the massive portion 98 of the blade 32. The massive portion 98 of the cutting blade 32 stabilizes the blade 32 and prevents the cutting edge 90 from flexing and bowing during a cutting operation which could result in an erratic cut line which is not vertical. The pocketed portion 96 is preferably the only portion of the blade 32 which engages the end portion of the shade 36 being cut. Thus, the pocketed portion 96 enables the blade 32 to effectively slice through the window shade 36 because the pocketed portion 96 is relatively thin.

Figure 5D:
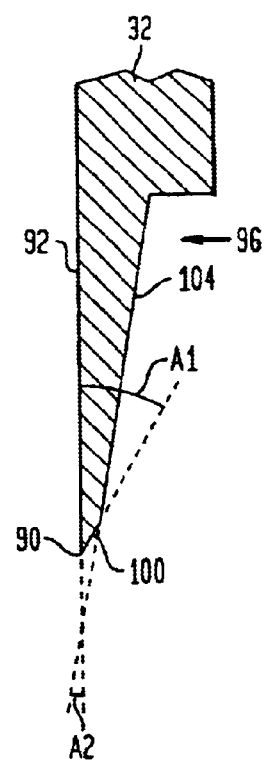
FIG. 5D shows a cross-sectional fragmentary side view of a pocket portion of the cutting blade shown in FIG. 5A.

Referring to FIG. 5D, pocketed portion 96 preferably includes a tapered region having a first tapered section 100 or bevel which extends up and away from the cutting edge 90 of the blade 32. The beveled section 100 and the first face 92 of the cutting blade 32 form a first acute angle designated $A_1$. The pocket 96 also includes a second tapered section 104 which extends up and away from the beveled section 100. The second tapered section 104 and the first face 92 of the cutting blade 32 form a second acute angle designated $A_2$ which is smaller than the first acute angle designated $A_1$.

Referring to FIGS. 1 and 2A, the cutting apparatus 20 also preferably includes a measuring assembly generally designated as 108 for measuring the end portion of the window shade being cut. In certain preferred embodiments, the measuring assembly includes a guard, hereinafter referred to as right hand guard 110, which prevents an operator from placing his or her hands under the cutting blade 32. The right hand guard 110 includes a removable end plate 112 remote from the cutting blade 32 which provides access to an area of the cutting apparatus 20 immediately downstream from the cutting blade 32. The right hand guard 110 preferably includes a rugged, but clear material which enables an operator to observe the cutting operation, such as Lexan, Plexiglas or Acrylic. The measuring assembly 108 includes a measuring instrument 114, such as a ruler, which is permanently attached to the right hand guard 110 for measuring the end portion of the window shade being cut. The ruler 114 is preferably attached to the underside of the right hand guard 110 and is visible through the right hand guard 110. The guard 110 includes two slots 116A and 116B on opposite sides thereof which extend horizontally away from the cutting blade 32. A stop block 118 is slidably mounted in the slots 116A and 116B and is movable toward and away from the cutting blade 32. The stop block 118 includes a stop knob 120 at one side thereof which can be hand tightened to secure the stop block 118 in place within the slots 116A and 116B. The stop block 118 preferably underlies the ruler 114 so that the length of the end portion of the window shade being cut can be accurately measured by aligning the stop block 118 with a certain spot on the ruler. For example, if a customer requests that two inches be cut off from one end of the window shade, then the stop block 118 is moved to a position two inches away from the cutting blade 32, as indicated by the ruler 114. Once the stop block 118 has been positioned at the desired distance from the cutting blade 32, the stop knob 120 is hand-tightened to secure the stop block 118 in place.

The stop block 118, and preferably the entire measuring assembly 108, is connected to a cam follower 122. In turn, the cam follower 122 is interconnected with the pinion 82 so that the entire measuring assembly 108 including the stop block 118 cams away from the cutting blade 32 as the cutting blade slices through an end portion of the window shade. Because the stop block 118 cams away, the end of the window shade 36 being cut is able to freely pivot down and away from the cutting blade 32, thereby reducing the compression force exerted by the blade 32 upon the window shade. In certain preferred embodiments, a cam collar 124 is connected to the pinion 82 for rotating with the pinion. The cam collar 124 has a groove 126 formed on the outer periphery thereof. The cam follower 122 is positioned within the groove 126 for interconnecting the cam collar 124 and the measuring assembly 108. When the pinion 82 rotates, the cam follower 122 moves through the groove 126 in the cam collar 124. The groove 126 guides the cam follower 122 away from the cutting blade 32 which causes the measuring assembly 108 and the stop block 118 to cam away from the cutting blade 32.

As mention above, the cutting apparatus 20 according to the present invention will preferably be located in a retail store so that customers may have window shades efficiently and economically cut to specified lengths. The cutting apparatus 20 will preferably be provided over a supporting element, such as a table. The cutting apparatus 20 will preferably be bolted or firmly secured to the table. The table may have an opening adjacent and/or downstream from the cutting blade 32 so the cut end portion of the window shade 36 can fall through the opening and into a waste container. Typically, a customer desiring window shades cut to a specified length will provide a salesperson (hereinafter referred to as the "operator") with the dimensions of one or more window openings. The operator may then refer to a chart, typically provided by the manufacturer of the window shades, in order to select a particular pre-stocked shade to be cut. Preferably the manufacturer will provide anywhere from five to ten, or even more, different models of shades. The manufacturer's chart may also provide the operator with information concerning how many inches or feet must be cut off one or both ends of the window shade.

Figure 6A:
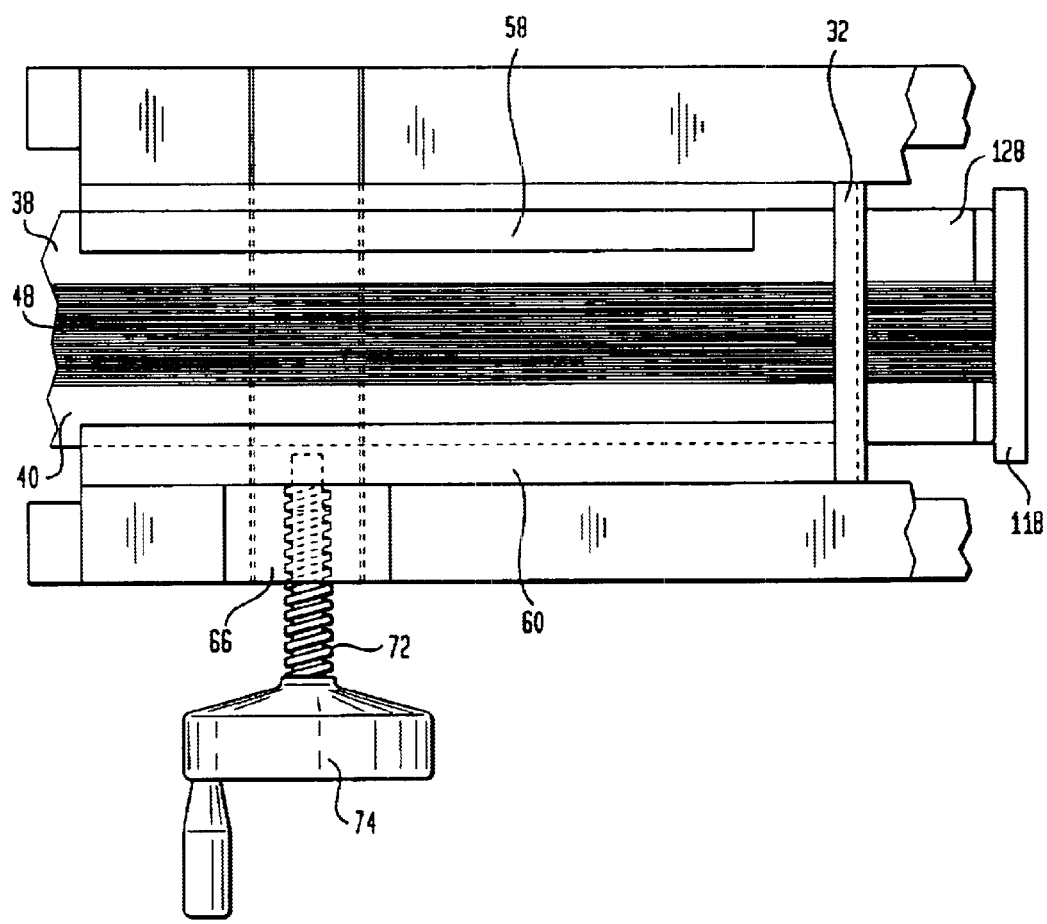
FIG. 6A shows a fragmentary top view of the window shade shown in FIG. 3A after the window shade has been inserted into the cutting apparatus of FIG. 1.
Figure 6B:
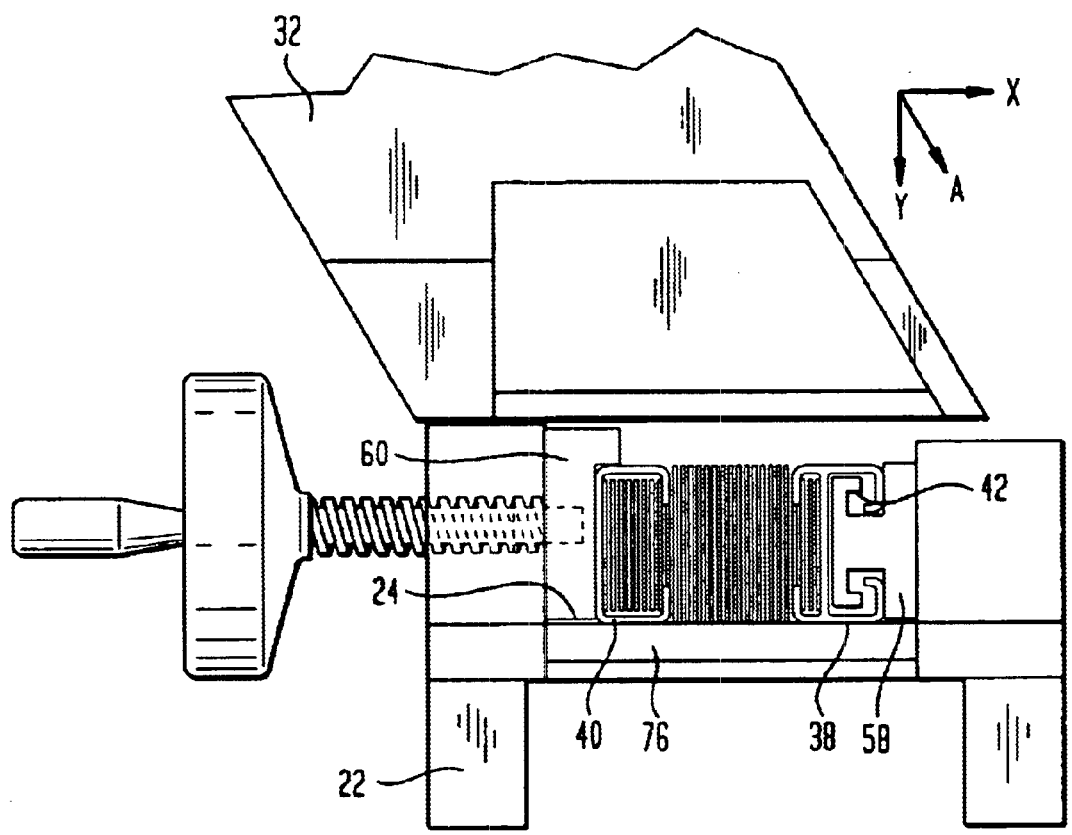
FIG. 6B shows a cross-sectional end view of the window shade and cutting apparatus shown in FIG. 6A.

Referring to FIGS. 6A and 6B, the end 128 of the window shade 36 to be cut is preferably positioned at the first end 52 of the cutting surface 24 of the base 22. After the end caps 44 (not shown) have been removed from the head rail 38 and the base rail 40, the window shade 36 is preferably aligned over the top surface 24 so the head rail 38 faces the guide rail 58 or mandrel and the base rail 40 faces the clamp block 60. The "C"-shaped opening 42 at the top of the head rail 38 is aligned with and slid over the mandrel 58, whereupon the head rail 38 is deemed to be captured by the mandrel 58. Once the head rail 38 has been captured by the mandrel 58, the window shade 36 is moved or inserted toward the second end 54 of the cutting surface 24 and the stop block 118. The window shade 36 continues to be inserted into the cutting apparatus 20 until the end portion 128 of the window shade 36 abuts against the stop block 118. At this stage, the cutting blade 32 overlies the end portion 128 of the window shade 36.

After the window shade 36 has been fully inserted into the cutting apparatus 20 and abutted against the stop block 118, the operator firmly secures the window shade 36 in place over the top surface 24 using the clamping assembly. The operator rotates the crank handle 74, preferably in a clockwise direction, which rotates the shaft, which in-turn causes the clamp block 60 to move toward the window shade 36 and the mandrel 58. The operator continues to hand-tighten the crank handle 74 until the clamp block 60 abuts against the base rail 40 and compresses the window shade 36 between the clamp block 60 and the mandrel 58. Once the window shade 36 has been secured over the cutting surface 24 of the base 22, the operator may cut the end 128 of the window shade 36.

Referring to FIGS. 2A and 2B, before the handle 86 may be pulled to cut the window shade 36, the safety pin 88 in the frame 26 must be retracted so as to free the pinion 82 for rotation. As the safety pin 88 is maintained in the retracted position, the handle 86 is preferably rotated downward toward the operator which rotates the pinion 82. As the pinion 82 rotates, the teeth 84 of the pinion 82 mesh with the teeth 80 of the rack 78 to move the cutting assembly 30 downward within the angled guide tracks 28A and 28B. As the cutting assembly 30 moves downward, the cutting blade 32 moves along the movement axis designated A—A in a direction which is diagonal to the top cutting surface 24 of the base 22 and the window shade 36. In other words, the cutting blade moves in a direction which has both vertical (y-axis) and horizontal (x-axis) components. Because the cutting blade 32 moves diagonally with respect to both the cutting surface 24 of the base 22 and the window shade 36 secured thereto, the cutting blade 32 slices through the window shade 36 in a diagonal direction. This slicing action, as opposed to an entirely vertical cut (Y-axis) or chopping action, greatly reduces the compression forces exerted by the blade 32 upon the window shade 36 and results in the formation of a cleaner cut. The slicing action also prevents the cut edges of the head and bottom rails 38, 40 from breaking or cracking.

Referring to FIG. 6B, the window shade is preferably configured over the top surface 24 of the base 22 so that the cutting edge 90 simultaneously abuts against the bottom rail 40, the head rail 38 and the window covering material 41. As the cutting edge 90 slices through the window shade 36 in a diagonal direction, the mandrel 58 supports the head rail 38 and functions as an inner die. Because the mandrel extends all the way to the second end 54 of the cutting surface 24 of the base 22 and terminates immediately before the first face 92 of the cutting blade 32, an extremely clean cut can be formed at the end of the head rail 38. The mandrel 58 also prevents the head rail 38 from rotating in the movement direction of the cutting blade 32 while it is being cut, thereby further contributing to the formation of a straight and clean cut.

Figure 7A:
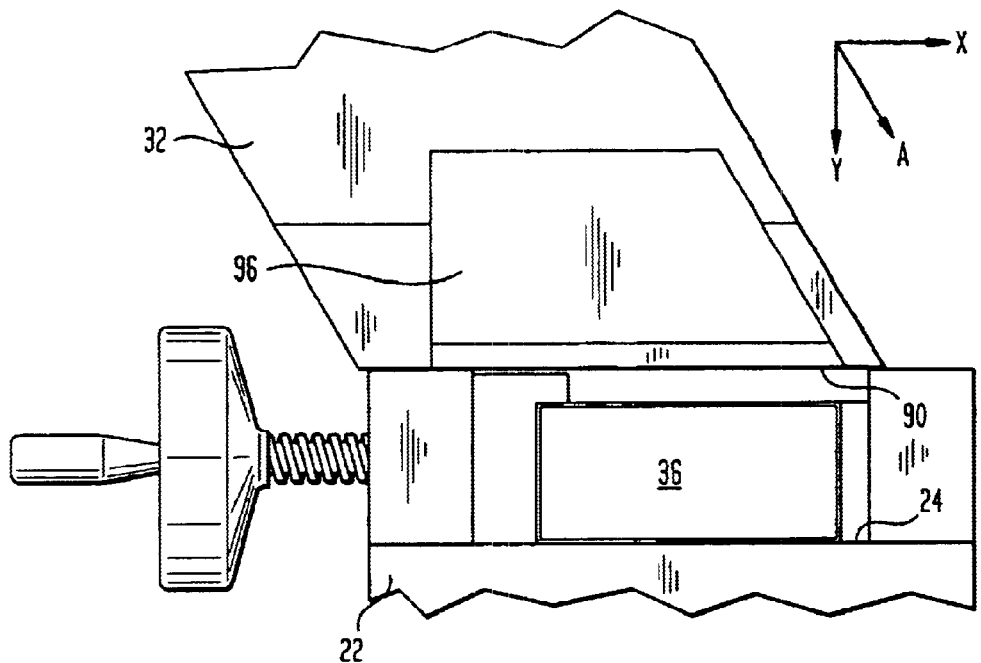
FIG. 7A shows a simplified view of FIG. 6B with the cutting blade initially contacting the window shade in accordance with certain preferred embodiments of the present invention.
Figure 7B:
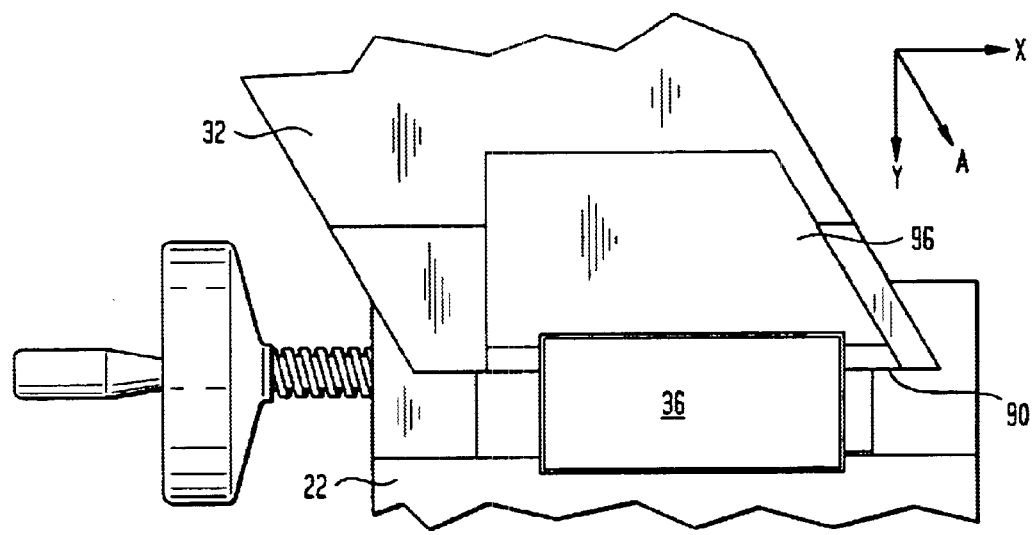
FIG. 7B shows the cutting blade of FIG. 7A during a further stage of a cutting operation.

FIGS. 7A–7C show the cutting blade 32 described above as the blade slices through the window shade 36. The window shade 36 and the base 22 are depicted as blocks for clarity of illustration. Initially, the cutting edge 90 engages the entire top of the window shade 36. In other words, the cutting edge 90 simultaneously engages the base rail 40, the window covering material and the head rail. As shown in FIG. 7B, the cutting edge moves vertically downward along the y-axis and to the side along the x-axis, i.e. diagonally through the window shade 36. The cutting edge 90 continues to move diagonally through the window shade 36 until the blade 32 has sliced completely through the shade 36, as shown in FIG. 7C. During the entire cutting operation only the pocket 96 engages the shade 36 which further minimizes the forces the blade exerts upon the shade 36. Moreover, the cutting edge 90 of cutting blade 30 to remain substantially parallel to cutting surface 24 during the entire cutting operation.

Figure 8A:
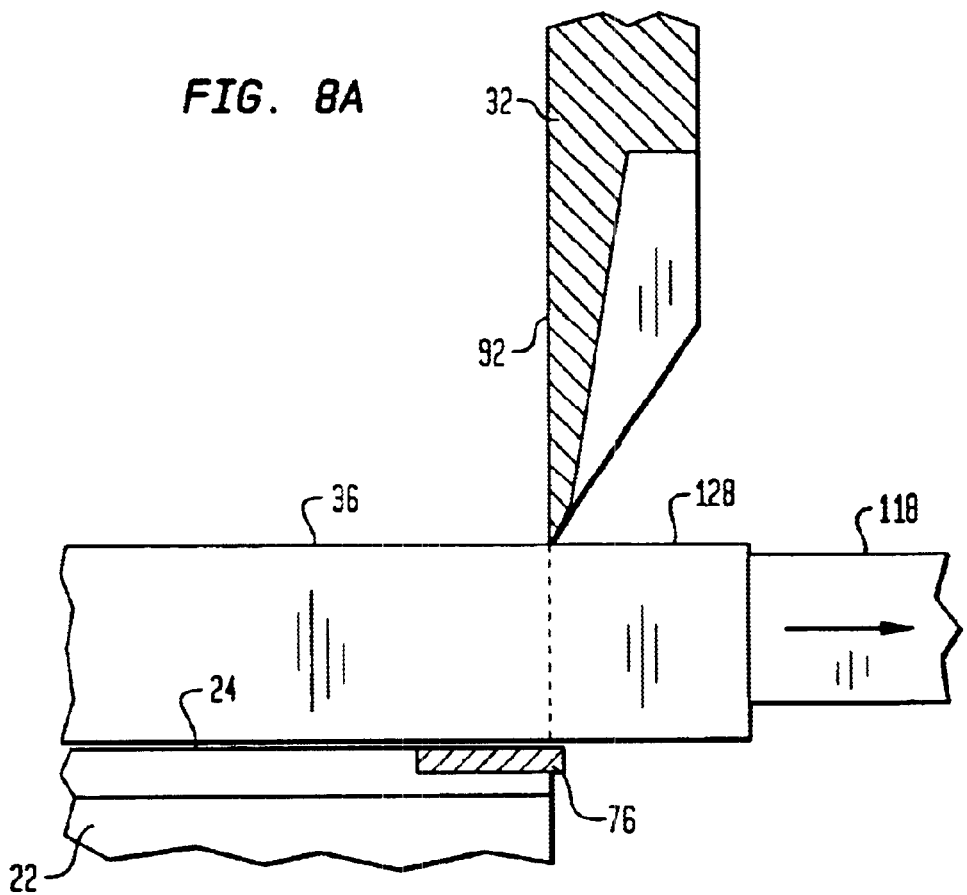
FIG. 8A shows a fragmentary side view of FIG. 7A.
Figure 8B:
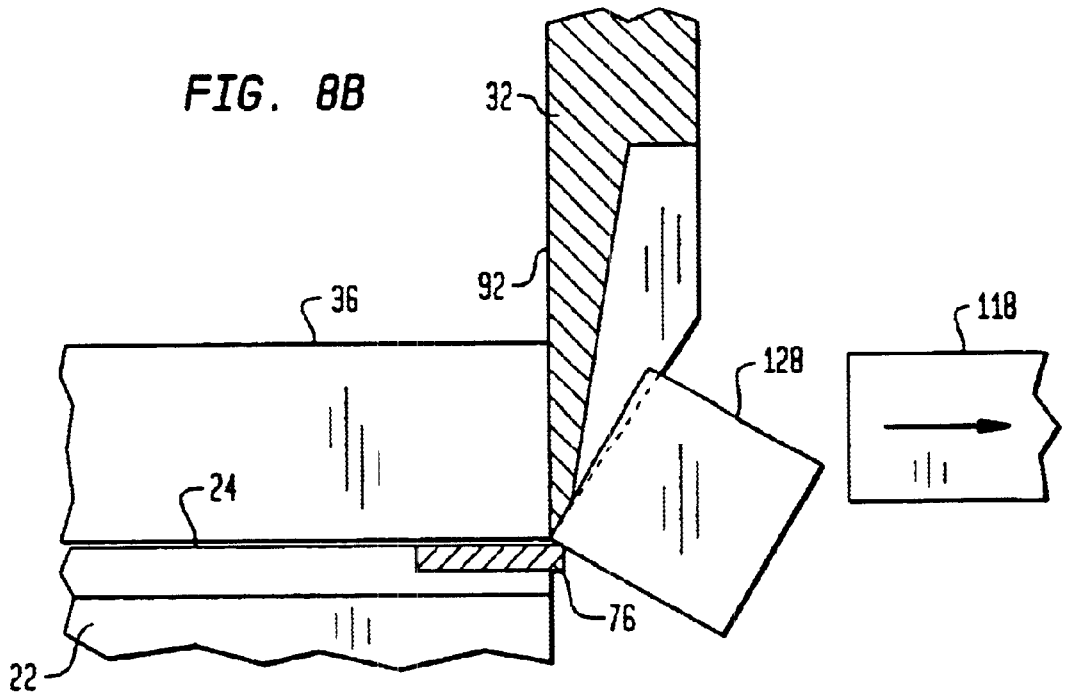
FIG. 8B shows a fragmentary side view of FIG. 7C.

FIGS. 8A and 8B show side views of FIGS. 7A and 7C, respectively. When the blade 32 initially engages the window shade 36, the stop block 118 abuts against the end of the window shade 36. However, shortly after the blade 32 begins to slice through the window shade 36, the stop block 118 cams away from the cutting blade 36 which allows the end portion 128 of the window shade 36, which is preferably unsupported, to freely pivot away from the cutting blade 32. By enabling the cut end portion 128 to pivot away from the blade 32, the forces exerted upon the window shade 36 by the cutting blade 32 are greatly reduced. This is of particular importance toward the end on the cutting stroke when the blade 32 has almost completely cut through the window shade 36 because at this point there exists an increased likelihood that the blade 36 will compress the head rail 38 and the bottom rail 40 which greatly increases the likelihood that those elements will crack.

As shown in FIGS. 8A and 8B, because the first face 92 of the cutting blade 32 is vertical and/or substantially flat, the blade 36 provides the window shade 36 with a clean, squared-off cut. As mentioned above, the pocketed portion 96 of the blade 32, which is much thinner than the rest of the blade 36, is the only portion of the blade which engages the window shade. This preferred design minimizes the thickness of the cutting blade 32 actually cutting through the window shade 36, thereby preventing the head rail 38 and the bottom rail 40 from cracking, breaking or tearing as the window shade 36 is cut. Because the pocketed portion 96 is tapered, the end portion 128 of the window shade being cut pivots away from the blade 32. When the blade 32 reaches the bottom portion of the cut, the thickness of the blade 32 at that section is particularly thin so that the blade 32 does not crack or break the head rail 38 or the bottom rail 40. The pocketed design results in only a thin portion of the blade 30 contacting the window shade 36; however, the massive portion of the blade 32 surrounding the pocket 96 stabilizes the pocketed portion 96 and prevents the blade 32 from bending during a cutting operation.

After the end portion 128 of the window shade 36 has been completely cut, the end portion 128 falls down and away from the cutting apparatus 20 and preferably through an opening in the supporting table. The operating handle 86 may then be rotated upward to its initial start position which will move the cutting blade 32 away from the backup 76. As the handle 86 is rotated upward, the safety pin 88 will re-engage the pinion 82 to lock the pinion 82 in place and prevent further rotation of the pinion. The crank handle 74 is then preferably rotated in a counter-clockwise direction to release the clamping force on the window shade 36 so that the window shade 36 may be removed from the cutting apparatus 20. The window shade 36 may then be removed by sliding the window shade 36 away from the first end 52 of the cutting surface 24 of the base 22, so that the "C"-shaped opening 42 in the head rail 38 may be released from the mandrel 58. If necessary, a second end of the window shade 36 may also be cut to a specified length using substantially the same techniques as described above. After the cutting operation is complete, the end caps 44 are preferably re-installed at the ends of the head rail 38 and the base rail 40.

As will be appreciated, numerous variations and combinations of the features discussed above may be utilized without departing from the present invention as defined in the claims. For example, the cutting assembly may follow an eccentric motion over a certain area of travel so as to multiply the force exerted by the cutting blade. In other embodiments, the cutting assembly may include a laser for cutting the window shade with laser light energy. Accordingly, the foregoing description of the preferred embodiments should be taken by way of illustration rather than by way of limitation of the present invention.

We claim:

1. An apparatus for cutting a window covering including a head rail, a bottom rail and slats extending between the head rail and the bottom rail, said apparatus comprising:

a base having a substantially flat cutting surface;

a frame overlying said cutting surface and mounted to said base, said frame and said cutting surface defining a receiving area therebetween for receiving said window covering;

said base including a clamping assembly slidably movable in a horizontal direction parallel to said cutting surface for securing the bottom rail, the slats and the top rail of said window covering in a side-by-side arrangement atop said cutting surface so that the bottom rail, the slats and the top rail are in contact with the substantially flat cutting surface;

a cutting assembly including a cutting blade having a cutting edge mounted to said frame for sliding along a movement axis toward and away from said receiving area, said movement axis having a first component of movement extending in a direction substantially parallel to said cutting surface and a second component of movement extending in a direction substantially perpendicular to said cutting surface; and a driver connected with said cutting assembly for imparting sliding motion to said cutting assembly for moving said cutting blade along the movement axis toward said receiving area, wherein said cutting surface, said clamping assembly and said cutting assembly are arranged so that the cutting edge of said cutting blade simultaneously engages and cuts through the bottom rail, the slats and the head rail of said window covering.

2. The apparatus as claimed in claim 1, wherein the cutting edge of said cutting blade remains substantially parallel to said substantially flat cutting surface when engaging and cutting through the bottom rail, the slats and the head rail of said window covering.

3. The apparatus as claimed in claim 1, wherein said cutting edge of said cutting blade remains substantially parallel to said substantially flat cutting surface during movement along the movement axis.

4. The apparatus as claimed in claim 1, wherein said substantially flat cutting surface includes a first end and a second end opposite the first end, the second end of said cutting surface including a backup opposing the cutting edge of said cutting blade, and wherein said backup is adapted, to engage the cutting edge after the cutting edge passes through the bottom rail, the slats and the head rail of said window covering for minimizing dulling of the cutting edge.

5. The apparatus as claimed in claim 4, wherein said backup is made of nylon.

6. The apparatus as claimed in claim 4, said base further comprising a guide mandrel extending between the first and second ends of said cutting surface, wherein said guide mandrel is adapted to slide within an opening of said top rail for guiding movement of said window covering across said cutting surface.

7. The apparatus as claimed in claim 6, wherein said clamping assembly is movable across said substantially flat cutting surface toward said guide mandrel for compressing the bottom rail, the slats and the top rail between said clamping assembly and said guide mandrel.

8. The apparatus as claimed in claim 7, wherein said clamping assembly includes a clamping block engagable with the bottom rail of said window covering for urging the bottom rail toward the top rail so as to compress the slats between the bottom rail and the top rail.

9. The apparatus as claimed in claim 1, wherein said cutting blade includes a pocketed portion that is thinner than a massive portion of said cutting blade that surrounds the pocketed portion, and wherein the cutting edge of said cutting blade is confined entirely with the pocketed portion of said cutting blade.

10. The apparatus as claimed in claim 9, wherein only the pocketed portion of said cutting blade engages the bottom rail, the slats and the top rail of said window covering during a cutting operation.

11. The apparatus as claimed in claim 1, further comprising a measuring assembly adjacent the second end of said cutting surface for measuring an end portion of said window covering to be cut during a cutting operation, wherein said measuring assembly includes a stop block abutable against the end of said window covering being cut and linked with said driver for moving away from said window covering during a cutting operation.

12. An apparatus for cutting a window covering including a head rail, a bottom rail and slats extending between the head rail and the bottom rail, said apparatus comprising:

a base having a substantially flat cutting surface;

a frame overlying said cutting surface and mounted to said base;

said base including a clamping assembly slidably movable in a horizontal direction parallel to said cutting surface for securing the bottom rail, the slats and the top rail of said window covering in a side-by-side arrangement atop said cutting surface so that the bottom rail, the slats and the top rail are in contact with the substantially flat cutting surface;

a cutting assembly including a cutting blade having a cutting edge mounted to said frame for sliding along a movement axis toward and away from said cutting surface, said movement axis having a first component of movement extending in a direction substantially parallel to said cutting surface and a second component of movement extending in a direction substantially perpendicular to said cutting surface; and a driver connected with said cutting assembly for moving said cutting blade along the movement axis toward said cutting surface, wherein said cutting surface, said clamping assembly and said cutting assembly are arranged so that the cutting edge of said cutting blade simultaneously engages and cuts through the bottom rail, the slats and the head rail of said window covering, and wherein the cutting edge of said cutting blade remains substantially parallel to said substantially flat cutting surface when engaging and cutting through the bottom rail, the slats and the head rail of said window covering.

13. The apparatus as claimed in claim 12, wherein said substantially flat cutting surface includes a first end and a second end opposite the first end, the second end of said cutting surface including a backup opposing the cutting edge of said cutting blade, and wherein said backup is adapted to engage the cutting edge after the cutting edge passes through the bottom rail, the slats and the head rail of said window covering for minimizing dulling of the cutting edge.

14. The apparatus as claimed in claim 12, said base further comprising a guide mandrel extending between first and second ends of said cutting surface, wherein said guide mandrel is adapted to engage said top rail for guiding movement of said window covering across said cutting surface.

15. The apparatus as claimed in claim 14, wherein said clamping assembly is movable across said substantially flat cutting surface and toward said guide mandrel for compressing the bottom rail, the slats and the top rail between said clamping assembly and said guide mandrel.

16. The apparatus as claimed in claim 12, wherein said cutting blade includes a pocketed portion that is thinner than a massive portion of said cutting blade, the massive portion of said cutting blade surrounding the pocketed portion, and wherein the cutting edge of said cutting blade is confined entirely with the pocketed portion of said cutting blade.

17. The apparatus as claimed in claim 16, wherein only the pocketed portion of said cutting blade engages the bottom rail, the slats and the top rail of said window covering during a cutting operation.

* * * * *